United States Patent [19]

Nakahama et al.

[11] Patent Number: 5,710,218
[45] Date of Patent: Jan. 20, 1998

[54] ETHYLENE-PROPYLENE-DIENE RUBBER, ELASTOMER COMPOSITION AND VULCANIZED RUBBER THEREOF

[75] Inventors: Hidenari Nakahama; Takashi Mishima, both of Ichihara, Japan

[73] Assignee: Mitsui Petrochemical Industries, Tokyo, Japan

[21] Appl. No.: 430,259

[22] Filed: Apr. 28, 1995

Related U.S. Application Data

[63] Continuation of Ser. No. 71,226, Jun. 2, 1993, abandoned, which is a continuation of Ser. No. 689,909, Jun. 4, 1991, abandoned.

[30] Foreign Application Priority Data

Oct. 5, 1989 [JP] Japan .................... 1-260666
Oct. 5, 1989 [JP] Japan .................... 1-260667

[51] Int. Cl.$^6$ .................... C08L 23/16; C08L 47/00; C08K 3/06
[52] U.S. Cl. .................... 525/211; 525/236; 525/237; 525/240; 525/331.8; 525/332.6; 524/302; 524/505; 524/742; 528/389
[58] Field of Search .................... 525/332.4, 331.8, 525/332.6, 211, 95, 236, 237, 240; 524/302, 742, 505; 528/389

[56] References Cited

U.S. PATENT DOCUMENTS

| | | | |
|---|---|---|---|
| 3,522,831 | 8/1970 | Torti et al. | 525/354 |
| 3,706,708 | 12/1972 | Kearnan et al. | 528/389 |
| 3,795,655 | 3/1974 | Le Claire et al. | 525/354 |
| 3,884,993 | 5/1975 | Gros | 525/237 |
| 3,897,405 | 7/1975 | Son et al. | 525/331.8 |
| 4,195,143 | 3/1980 | Sommer, Jr. | 525/354 |
| 4,737,542 | 4/1988 | Kifune et al. | 524/742 |
| 4,739,036 | 4/1988 | Colvin et al. | 528/389 |
| 4,740,559 | 4/1988 | Johansson et al. | 528/389 |
| 4,778,852 | 10/1988 | Futamura | 524/505 |
| 4,855,364 | 8/1989 | Sandstrom | 525/331.8 |
| 4,882,387 | 11/1989 | Tobing | 525/237 |
| 4,956,413 | 9/1990 | Tanimoto et al. | 525/237 |
| 5,242,971 | 9/1993 | Nakahama et al. | 524/526 |

FOREIGN PATENT DOCUMENTS

| | | | |
|---|---|---|---|
| 0698976 | 12/1964 | Canada | 525/331.8 |
| 0910520 | 9/1972 | Canada | 525/331.8 |
| 0227206 | 1/1987 | European Pat. Off. | |
| 0246745 | 11/1987 | European Pat. Off. | |
| 0264653 | 4/1988 | European Pat. Off. | |
| 2146419 | 3/1973 | Germany | 525/354 |

*Primary Examiner*—Joseph L. Schofer
*Assistant Examiner*—Olga Asinovsky

[57] ABSTRACT

The invention provides ethylene-propylene-diene rubbers capable of imparting excellent heat resistance, weather resistance and dynamic fatigue resistance to vulcanized rubbers made therefrom. The ethylene-propylene-diene rubbers have sulfur dispersed therein at a temperature of 90° to 160° C. prior to the addition of vulcanization accelerators or other rubber additives. The ethylene-propylene-diene rubbers contain (A) 90 to 40% by weight of a high-molecular weight ethylene-propylene-diene copolymer rubber having an ethylene content of 60 to 82 mol %, an intrinsic viscosity ($\eta$) of 3.0 to 5.0 dl/g as measured at 135° C. in decalin and an iodine value of 8 to 35, (B) 10 to 60% by weight of a low-molecular-weight ethylene-propylene-diene copolymer rubber having an ethylene content of 60 to 82 mol %, an intrinsic viscosity ($\eta$) of 0.15 to 0.8 dl/g as measured at 135° C. in decalin and an iodine value of 8 to 35, and (C) sulfur in an amount of 0.1 to 5 parts by weight based on 100 parts by weight of the rubber dispersed therein at a temperature of 90° to 160° C. prior to the addition of a vulcanization accelerator or other rubber additive. The vulcanized rubbers are particularly suitable for use as automobile components which require dynamic fatigue resistance such as muffler hangers, belts, rubber vibration insulators, engine mounts, tire treads for pneumatic tires, sidewalls for pneumatic tires and white sidewalls.

16 Claims, No Drawings

ETHYLENE-PROPYLENE-DIENE RUBBER, ELASTOMER COMPOSITION AND VULCANIZED RUBBER THEREOF

This application is a continuation of application Ser. No. 08/071,226 filed Jun. 2, 1993, which is a continuation of Ser. No. 07/689,909, filed Jun. 4, 1991 now abandoned.

TECHNICAL FIELD

This invention relates to ethylene-propylene-diene rubbers, elastomer compositions and vulcanized rubbers thereof.

TECHNICAL BACKGROUND

Since ethylene-propylene-diene rubbers (EPDM) have such a molecular structure that the main chain thereof has no double bond, they are excellent in weather resistance, ozone resistance and thermal aging resistance and are widely used for the static sections of automobile parts, such as weather stripping, door glass run channel, radiator hose, etc. which require heat resistance.

On the other hand, most of parts such as tires, rubber vibration insulators, etc. which require mechanical strength against dynamic fatigue are prepared by using conjugated diene rubbers such as NR, SBR and BR or blends thereof.

With the higher performance of automobiles in recent years, it is expected that EPDM is applied to automobile parts which are conventionally considered to be prepared only from conjugated diene rubbers such as NR, SBR and BR or blends thereof so far which are excellent in dynamic fatigue resistance.

Though EPDM is excellent in weather resistance, ozone resistance and thermal aging resistance, products obtained therefrom are poor in reliability and dynamic fatigue resistance. This is the reason why EPDM alone cannot be used for the preparation of tires and engine mounts and cannot be practically applied to automobile parts which require dynamic fatigue resistance.

Examples of the dynamic applications of EPDM are disclosed in Japanese Patent Publication Nos. 30582/1976 and 777/1977. In the inventions disclosed in these patent specifications, sulfur and sulfur initiator must be used and the inventions are directed to provide EPDM excellent in co-vulcanizability with highly unsaturated rubbers. Further, the co-vulcanizability thereof is evaluated only by the tensile strength (Tb) of the blends thereof with unsaturated rubbers. On the other hand, whether dynamic fatigue resistance is imparted to EPDM can be evaluated only after fatigue test. In this sense, these patent publications suggest nothing about EPDM which alone is excellent in dynamic fatigue resistance.

The inventions disclosed in the above-described patent publications relate to processes for the preparation of the co-vulcanized materials of lowly unsaturated rubbers and highly unsaturated rubbers and are directed not to impart dynamic fatigue resistance to EPDM, but to impart heat resistance and ozone resistance while retaining excellent dynamic fatigue resistance which conjugated diene rubbers possess.

Japanese Patent Laid-Open Publn. No. 22551/1978 discloses a vulcanizable composition for rubber vibration insulator, as a rubber vibration insulator composition comprising an ethylene-propylene rubber having improved fatigue failure life, which is obtained by adding 5 to 90 parts by weight of carbon black, 0.1 to 2 parts by weight of sulfur, each of the amounts of said carbon black and said sulfur being per 100 parts by weight of following rubber component and optionally process oil to an oil-extended rubber composed of a mixture consisting of 10 to 50% by weight of an ethylene-propylene-ethylidenenorbornene terpolymer having an intrinsic viscosity [η] of not higher than 1.0 as measured at 70° C. in xylene solution, 90 to 50% by weight of an ethylene-propylene-ethylidene-norbornene terpolymer having an intrinsic viscosity [η] of not lower than 3.0 as measured in the same manner as that described above and 20 to 80 parts by weight of extender oil based on 100 parts by weight of rubber.

However, the dynamic fatigue resistance of conventional EPDM cannot be greatly improved merely by combining a high-molecular-weight ethylene-propylene-ethylidenenorbornene terpolymer with a low-molecular-weight ethylene-propylene-ethylidenenorbornene terpolymer.

As an example of requiring dynamic fatigue resistance most, there is described in Rubber Chemistry Technology, Vol.44, page 1043 (October 1971) that the desired characteristics can be obtained by using EPDM having a high Mooney viscosity for All-EPDM for rubber vibration insulator.

However, the use of high-molecular-weight EPDM is considered to be a matter which is conceived by those skilled in the art. The most essential point of research and development on EPDM is to improve physical properties of EPDM without detriment to processability. The processability of EPDM is a factor which is contrary to an increase in the molecular weight. Any means for obtaining high molecular EPDM having an excellent processability has not been disclosed as yet.

Accordingly, it has been demanded to provide ethylene-propylene-diene rubber, an elastomer composition containing said ethylene-propylene-diene rubber and vulcanized rubber thereof, said ethylene-propylene-diene rubber being capable of withstanding use under severe conditions under which dynamic mechanical endurance is required and only natural rubber and blends thereof are conventionally considered to be usable and at the same time, said ethylene-propylene-diene rubber being capable of imparting excellent heat resistance, weather resistance and dynamic fatigue resistance.

The present inventors have eagerly made studies and found that an elastomer composition having surprisingly excellent dynamic fatigue resistance can be obtained by previously dispersing sulfur in an ethylene-propylene-diene rubber, then blending appropriate amounts of carbon black, a softener and other filler therewith and kneading them. The present invention has been accomplished on the basis of this finding.

Accordingly, an object of the present invention is to provide ethylene-propylene-diene rubbers, elastomer compositions containing said ethylene-propylene-diene rubbers and vulcanized rubbers, said ethylene-propylene-diene rubbers being capable of withstanding uses under severe conditions under which dynamic mechanical endurance is required and only natural rubber and blends thereof are conventionally considered to be usable and at the same time, said ethylene-propylene-diene rubbers being capable of imparting excellent heat resistance, weather resistance and dynamic fatigue resistance.

DISCLOSURE OF THE INVENTION

The ethylene-propylene-diene rubbers of the present invention are characterized by that sulfur in a dispersed state is present in the ethylene-propylene-diene rubbers.

In the present invention, there are preferred the ethylene-propylene-diene rubbers wherein sulfur in a dispersed state is present in an ethylene-propylene-diene rubber having a Mooney viscosity $ML_{1+4}$ (100° C.) of 60 to 120 and comprising (A) 90 to 40% by weight of a high-molecular-weight ethylene-propylene-diene copolymer rubber having an ethylene content of 60 to 82 mol %, an intrinsic viscosity [η] of 3.0 to 5.0 dl/g as measured at 135° C. in decalin and an iodine value of 8 to 35, and (B) 10 to 60% by weight of a low-molecular-weight ethylene-propylene-diene copolymer rubber having an ethylene content of 60 to 82 mol %, an intrinsic viscosity [η] of 0.15 to 0.8 dl/g as measured at 135° C. in decalin and an iodine value of 8 to 35.

The vulcanizable elastomer compositions of the present invention are characterized by containing an ethylene-propylene-diene rubber containing sulfur in a dispersed state therein.

The vulcanized rubbers of the present invention are characterized in that they are obtained by vulcanizing the above-described elastomer compositions of the present invention.

BEST MODE FOR CARRYING OUT THE INVENTION

The ethylene-propylene-diene rubbers, the elastomer compositions and the vulcanized rubbers thereof according to the present invention are concretely illustrated below.

The ethylene-propylene-diene rubbers of the present invention are ethylene-propylene-diene rubbers containing sulfur in a dispersed state therein.

The ethylene-propylene-diene rubbers (EPDM) used in the present invention include low-molecular-weight ethylene-propylene-diene copolymer rubbers, high-molecular-weight ethylene-propylene-diene copolymer rubbers and blends thereof, but are not limited to the ethylene-propylene-diene rubbers as mentioned above in the present invention.

In the present invention, ethylene-propylene-diene rubbers comprising such a specific high-molecular-weight ethylene-propylene-diene copolymer rubber (A) and such a specific low-molecular-weight ethylene-propylene-diene copolymer rubber (B) as described above are particularly preferred.

The above-described high-molecular-weight ethylene-propylene-diene copolymer rubbers (A) comprise ethylene, propylene and a non-conjugated diene.

Examples of the non-conjugated diene include concretely chain non-conjugated dienes such as 1,4-hexadiene and cyclic non-conjugated dienes such as ethylidenenorbornene (ENB), norbornadiene, methylnorbornene, dicyclopentadiene, 2-methylnorbornadiene and 5-vinyl-2-norbornene. Of these compounds, ENB is particularly preferable.

The high-molecular-weight ethylene-propylene-diene copolymer rubbers (A) of the present invention have an iodine value of 8 to 35, preferably 10 to 30, said iodine value being an index of conjugated diene content.

The high-molecular-weight ethylene-propylene-diene copolymer rubbers (A) of the present invention have an intrinsic viscosity [η] of 3.0 to 5.0 dl/g, preferably 3.0 to 4.3 dl/g as measured at 135° C. in decalin and an ethylene content of 60 to 82 mol %. It is preferred that the ethylene content is in the range of 60 to 72 mol % when used in the fields of particular products such as engine mounts for which less change in damping properties over a range of from low temperature to high temperature is required, while it is preferred that a high-ethylene type EPDM having a high mechanical strength is used, that is, the ethylene content is in the range of 70 to 80 mol % when used in the fields of products which are used at a temperature of not lower than room temperature.

The above-described low-molecular-weight ethylene-propylene-diene copolymer rubbers (B) of the present invention comprise ethylene, propylene and a non-conjugated diene. The non-conjugated dienes are the same non-conjugated dienes as those used in the above-described high-molecular-weight ethylene-propylene-diene copolymer rubbers (A). ENB is particularly preferable.

The iodine value of the low-molecular-weight ethylene-propylene-diene copolymer rubbers (B) used in the present invention is the same value as that of the high-molecular-weight ethylene-propylene-diene copolymer rubbers (A) and is in the range of 8 to 35, preferably 10 to 30.

In the present invention, with an increase in a difference in non-conjugated diene content, that is, iodine value between the high-molecular-weight ethylene-propylene-diene copolymer rubber (A) and the low-molecular-weight ethylene-propylene-diene copolymer rubber (B), vulcanization rate becomes nonuniform and properties such as strength and sets such as compression set (CS) are apt to exert a bad effect on the vulcanized rubber. Hence, it is preferred that the rubbers are so chosen that the iodine value of the low-molecular-weight ethylene-propylene-diene copolymer rubber (B) is equal to that of the high-molecular-weight ethylene-propylene-diene copolymer rubber (A).

The low-molecular-weight ethylene-propylene-diene copolymer rubbers (B) used in the present invention have an intrinsic viscosity [η] of 0.15 to 0.8 dl/g, preferably 0.2 to 0.4 dl/g as measured at 135° C. in decalin and an ethylene content of 60 to 82 mol %. It is preferred that the ethylene content is in the range of 60 to 72 mol % when used in the fields of particular products such as engine mount for which less change in damping properties over a range of from low temperature to high temperature is required, while it is preferred that a high-ethylene type EPDM having a high mechanical strength is used, that is, the ethylene content is in the range of 70 to 80 mol % when used in the fields of products which are used at a temperature of not lower than room temperature.

When the intrinsic viscosity [η] of the low-molecular-weight ethylene-propylene-diene copolymer rubber is lower than 0.15 dl/g, the properties thereof become equal to those of paraffinic or naphthenic softeners and hence an effect of improving mechanical strength and fatigue life cannot be expected.

When the elastomer compositions comprising the above-described ethylene-propylene-diene rubbers containing a high-molecular-weight ethylene-propylene-diene copolymer rubbers (A) and a low-molecular-weight ethylene-propylene-diene copolymer rubbers (B) are in an unvulcanized state, the low-molecular-weight ethylene-propylene-diene copolymer rubber (B) plays a role in widening the molecular weight distribution of the ethylene-propylene-diene rubbers and works as a softener so that the elastomer compositions of the present invention can retain high strength and excellent dynamic fatigue resistance which the high-molecular-weight ethylene-propylene-diene copolymer rubbers (A) possess.

When the elastomer compositions are in a vulcanized state, the low-molecular-weight ethylene-propylene-diene copolymer rubber (B) has an effect of improving rubber strength and enhancing dynamic fatigue resistance of the resulting vulcanized rubber by a stress relaxing effect, because the copolymer rubber (B) itself participates in vulcanization.

In the present invention, the high-molecular-weight ethylene-propylene-diene copolymer rubber (A) is used in an amount of 90 to 40% by weight, preferably 85 to 60% by weight based on 100% by weight Of the combined amount of the high-molecular-weight ethylene-propylene-diene copolymer rubber (A) and the low-molecular-weight ethylene-propylene-diene copolymer rubber (B). The low-molecular-weight ethylene-propylene-diene copolymer rubber (B) is used in an amount of 10 to 60% by weight, preferably 15 to 40% by weight based on 100% by weight of the combined amount of the copolymer rubbers (A) and (B).

The ethylene-propylene-diene rubbers comprising the high-molecular-weight ethylene-propylene-diene copolymer rubber (A) and the low-molecular-weight ethylene-propylene-diene copolymer rubber (B) as mentioned above have a Mooney viscosity $ML_{1+4}$ (100° C.) of 60 to 120, preferably 80 to 100.

The ethylene-propylene-diene rubbers having a Mooney viscosity $ML_{1+4}$ (100° C.) within the range described above have good kneadability in Banbury mixer.

In order to evaluate a dynamic fatigue resistance of EPDM, the present inventors made a dynamic viscoelasticity test (distortion factor: 10%, temperature 190° C., sample stand: parallel plate, frequency: $1.58 \times 10^{-2}$ rad/s to $5 \times 10^2$ rad/s) wherein the abscissa axis represents frequency, the ordinate axis represents complex shear modulus $G^*$, $\omega_2$ is a frequency corresponding to $G^*=1E6$ and $\omega_1$ is a frequency corresponding to $G^*=1E5$ and expressed the state of the processability and physical properties of EPDM by an index $\omega_r$ defined by $\omega_r=\omega_2/\omega_1$. The index $\omega_r$ is variable in proportion to the number of the side chains of EPDM, mutual intertwisting ratio, the composition distribution and molecular weight distribution thereof. Hence, the state of processability and physical properties can be well expressed by using the index $\omega_r$. Among the ethylene-propylene-diene rubbers of the present invention, ethylene-propylene-diene rubbers having $\omega_r$ of 50 to 150 are particularly excellent in balance between kneadability and physical properties. The ethylene-propylene-diene rubbers having $\omega_r$ within the range described above can be applied to dynamic uses, because they are excellent in kneadability as well as in crack growth resistance and thermal aging resistance.

In the present invention, sulfur in a dispersed state is present in the ethylene-propylene-diene rubbers.

Namely, elastomer compositions having excellent dynamic fatigue resistance, which are intended by the present invention, cannot be obtained by using an ethylene-propylene-diene rubber (EPDM) comprising merely a combination of the aforesaid high-molecular-weight ethylene-propylene-diene copolymer rubber (A) with the aforesaid low-molecular-weight ethylene-propylene-diene copolymer rubber (B), though an effect of improving dynamic fatigue resistance can be appreciably obtained by using the rubber comprising merely said combination in comparison with oil-extended high-molecular-weight ethylene-propylene-diene copolymer rubbers. However, the elastomer compositions containing EPDM comprising merely said combination are markedly inferior in dynamic fatigue resistance in comparison with diene rubbers such as natural rubber (NR).

Hence, the present inventors have eagerly made studies and found that elastomer compositions having surprisingly excellent dynamic fatigue resistance can be obtained by previously dispersing sulfur in the ethylene-propylene-diene rubbers comprising the high-molecular-weight ethylene-propylene-diene copolymer rubbers (A) and the low-molecular-weight ethylene-propylene-diene copolymer rubbers (B), then blending appropriate amounts of carbon black, a softener and other filler therewith and kneading the resulting blend.

Methods for dispersing sulfur in the ethylene-propylene-diene rubbers (EPDM) include the following methods.

(1) A solvent method wherein sulfur is added to the ethylene-propylene-diene rubber in the form of a solution and then the solvent is removed to disperse sulfur therein.

In this dispersion method, a solvent incapable of dissolving sulfur, such as hexane can be used, but sulfur required for vulcanization must be uniformly dispersed in the ethylene-propylene-diene rubber. In this sense, it is desirable to use a solvent capable of dissolving sulfur as well as the ethylene-propylene-diene rubber.

(2) A kneading method wherein sulfur is incorporated into the solid ethylene-propylene-diene rubber by using a kneader or an internal mixer.

Temperature at which sulfur is dispersed is in the range of preferably 90° to 160° C., more preferably 110° to 150° C.

EPDM is originally poor in affinity with sulfur in comparison with diene rubbers and sulfur is poorly dispersed in EPDM by conventional kneading method. It is believed that when sulfur is previously dispersed in EPDM by the above-mentioned (1) solvent method or (2) kneading method, sulfur participating in crosslinking is well arranged near the main chains of the molecules of EPDM and when conventional kneading is carried out in that state, sulfur is activated by heat of kneading, the molecules of EPDM are effectively bonded to each other in a mesh form and sulfur itself forms polysulfur bonds to exert an effect of relaxing external stress effectively, thereby the effect of the present invention can be obtained, that is, dynamic fatigue resistance can be imparted. Thus, it is the most important factor for exhibiting the effect of the present invention that sulfur is present in a dispersed state in EPDM.

In the present invention, sulfur is used in an amount of 0.1 to 5 parts by weight, preferably 0.3 to 3.0 parts by weight based on 100 parts by weight of the ethylene-propylene-diene rubber.

The elastomer compositions of the present invention comprise the ethylene-propylene-diene rubbers of the present invention, and optionally softeners and fillers such as inorganic fillers used in the preparation of vulcanized rubbers described hereinafter.

Preparation of Vulcanized Rubber

Vulcanized rubber can be obtained from the elastomer compositions of the present invention by a method described hereinafter, that is, preparing an unvulcanized rubber blend (elastomer composition), molding the rubber blend into a desired shape and then vulcanizing it in usual the vulcanization way of general-purpose rubber.

In the preparation of the vulcanized rubbers of the present invention, the types and amounts of softeners and fillers such as inorganic filler, the types and amounts of vulcanization accelerators and stages for preparing vulcanized rubber in addition to the above-described sulfur-containing ethylene-propylene-diene rubbers are properly chosen according to uses of vulcanized rubbers and required properties thereof.

As the softeners, those generally used for rubber are used. Concretely, examples of softeners include petroleum softeners such as process oil, lubricating oil, paraffin, liquid paraffin, petroleum asphalt and Vaseline; coal tar softeners such as coal tar and coal tar pitch; fatty oil softeners such as castor oil, linseed oil, colza oil and coconut oil; tall oil; factice; wax such as beeswax, carnauba wax and lanolin; fatty acids and salts thereof such as ricinoleic acid, palmitic acid, barium stearate, calcium stearate and zinc laurate; and synthetic high-molecular materials such as petroleum resin, atactic polypropylene and coumarone indene resin. Among them, petroleum softeners are preferred and process oil is particularly preferred.

Concrete examples of inorganic fillers include carbon black such as SRF, GPF, FEF, HAF, ISAF, SAF, FT and MT, fine silicic acid powder, precipitated calcium carbonate, heavy calcium carbonate, talc and clay. In the present invention, the inorganic fillers may be used in an amount of 20 to 150 parts by weight, preferably 30 to 100 parts by weight, more preferably 40 to 80 parts by weight based on 100 parts by weight of the ethylene-propylene-diene rubber containing no sulfur. When the inorganic fillers are used in an amount within the range described above, there can be obtained elastomer compositions and vulcanized rubbers which are excellent in wear resistance and dynamic fatigue resistance.

It is preferred that vulcanization accelerators are used in the present invention. Concrete examples of the vulcanization accelerators include thiazole compounds such as N-cyclohexyl-2-benzothiazole-sulfenamide, N-oxydiethylene-2-benzothiazole-sulfenamide, N,N-diisopropyl-2-benzothiazole-sulfenamide, 2-mercaptobenzothiazole, 2-(2,4-dinitrophenyl) mercaptobenzothiazole, 2-(2,6-diethyl-4-morpholinothio) benzothiazole and dibenzothiazyl disulfide; guanidine compounds such as diphenylguanidine, triphenylguanidine, di-o-tolylguanidine, o-tolylbiguanide and diphenylguanidine phthalate; aldehyde-amine or aldehyde-ammonia compounds such as acetaldehyde-aniline reaction product, butylaldehyde-aniline condensate, hexamethylene-tetramine and acetaldehyde-ammonia reaction product; imidazoline compounds such as 2-mercaptoimidazoline; thiourea compounds such as thiocarbanilide, diethylthiourea, dibutylthiourea, trimethylthiourea and di-o-tolylthiourea; thiuram compounds such as tetramethylthiuram monosulfide, tetramethylthiuram disulfide, tetraethylthiuram disulfide, tetrabutylthiuram disulfide and pentamethylenethiuram tetrasulfide; dithio acid salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate; xanthate compounds such as zinc dibutylxanthate; and other compounds such as zinc oxide.

The vulcanization accelerators may be used in an amount of 0.1 to 20 parts by weight, preferably 0.2 to 10 parts by weight based on 100 parts by weight of the ethylene-propylene-diene rubber containing no sulfur.

Unvulcanized rubber blends are prepared in the following manner. Namely, the above-described ethylene-propylene-diene rubber of the present invention, the softener and the filler such as inorganic filler are kneaded at a temperature of 80° to 170° C. for 3 to 10 minutes in a mixer such as Banbury mixer. Optionally, the vulcanization accelerator is added thereto. The resulting mixture is kneaded at a roller temperature of 40° to 80° C. for 5 to 30 minutes by using rollers such as open rolls and the kneaded material is extruded to prepare a ribbon-form or sheet-form rubber blend.

The thus-prepared rubber blend is molded into a desired shape by means of extrusion, calendering rolls or press. The molded article simultaneously with molding or after molding is introduced into a vulcanizer and heated at a temperature of 150° to 270° C. for 1 to 30 minutes to obtain vulcanized rubber. In conducting such vulcanization, a mold may be used or not used. When the mold is not used, molding and vulcanizing stages are generally carried out in a continuous manner.

As heating means in vulcanizing tank, there can be used hot air, glass bead-fluidized bed, UHF (ultrashort wave electromagnetic wave) and steam.

EFFECT OF THE INVENTION

In the ethylene-propylene-diene rubbers of the present invention, sulfur is present in a dispersed state in the ethylene-propylene-diene rubbers. Accordingly, the ethylene-propylene-diene rubbers of the present invention are capable of withstanding uses under severe conditions under which dynamic mechanical endurance is required and only natural rubber or blends thereof are conventionally considered to be usable and at the same time, said ethylene-propylene-diene rubbers have an effect of imparting excellent heat resistance, weather resistance and dynamic fatigue resistance.

The ethylene-propylene-diene rubbers having the above-mentioned excellent effect are ethylene-propylene-diene rubbers containing sulfur in a dispersed state wherein sulfur is dispersed in an ethylene-propylene-diene rubber having a Mooney viscosity $ML_{1+4}$ (100° C.) of 60 to 120 and comprising (A) 90 to 40% by weight of a high-molecular-weight ethylene-propylene-diene copolymer rubber having an ethylene content of 60 to 82 mol %, an intrinsic viscosity $[\eta]$ of 3.0 to 5.0 dl/g as measured at 135° C. in decalin and an iodine value of 8 to 35, and (B) 10 to 60% by weight of a low-molecular-weight ethylene-propylene-diene copolymer rubber having an ethylene content of 60 to 82 mol %, an intrinsic viscosity $[\eta]$ of 0.15 to 0.8 dl/g as measured at 135° C. in decalin and an iodine value of 8 to 35.

Among the ethylene-propylene-diene rubbers, ethylene-propylene-ethylene-diene rubbers having $\omega_r$ within the range of 50 to 150 are particularly effective, said $\omega_r$ being an index of processability and physical properties.

Since the elastomer compositions of the present invention contain the ethylene-propylene-diene rubbers having the above-described effects, the elastomer compositions are capable of withstanding uses under severe conditions under which dynamic mechanical endurance is required and only natural rubbers or blends thereof are conventionally considered to be usable and at the same time, the elastomer compositions have an effect of imparting excellent heat resistance, wheather resistance and dynamic fatigue resistance, and moreover vulcanized rubbers having the above effects can be provided.

The vulcanized rubbers of the present invention have scarcely any unevenness in tensile strength and tensile elongation and less variability of fatigue test results so that they have an effect of stabilizing quality, the stabilization of quality being required when goods are actually manufactured.

The vulcanized rubbers obtained from the elastomer compositions of the present invention have the effects as mentioned above so that they can be widely used in the fields of tires, automobile parts, general-purpose industrial components and civil engineering and building components. Particularly, the vulcanized rubbers of the present invention are suitable for use in the fields of materials such as muffler hangers, belts, rubber vibration insulators, engine mounts, tire treads for pneumatic tires, sidewalls for pneumatic tires and white sidewalls which require dynamic fatigue resistance, said materials prepared only from diene rubbers, particularly natural rubber or blends thereof being conventionally considered to be usable.

The present invention is now illustrated by reference to the following examples which, however, are not to be construed as limiting the present invention in any way.

The evaluation tests of vulcanized sheets in Examples and Comparative Examples were carried out in accordance with the methods as described below.

(1) Tensile test

No. 3 type dumbbell specimens described in JIS K 6301 were punched out of vulcanized rubber sheets. The specimens were subjected to a tensile test under such conditions that the measuring temperatures was 25° C. and the pulling rate was 500 mm/min according to the method described in JIS K 6301, item 3. Tensile stress at break $T_B$ and tensile elongation at break $E_B$ were measured.

(2) Thermal aging resistance

Thermal aging resistance was evaluated by the changes of the following retention of stress at break, the following retention at elongation at break and JIS A hardness according to JIS K 6301-1975, 6.5.

(i) No.1 type dumbbell tensile test specimens according to JIS K 6301 were punched out of sheets from the length direction thereof. The specimens were left to stand at 120° C. for 72 hours, and then set to room temperature. The specimens were subjected to a tensile test at a rate of 200 mm/min. Stress at break (T Baged) and elongation at break (E Baged) were measured. Samples before thermal aging test were previously tested to measure stress at break (T Borig) and elongation at break (E Borig), and the retention of stress at break and the retention at break were calculated.

Retention (%) of stress at break
=(T Baged/T Borig)×100
Retention (%) of elongation at break
=(E Baged/E Borig)×100

(ii) Change of JIS A hardness (JIS K 6301)

$$A_H = H_2 - H_1$$

In the above formula, $A_H$ represents a change in JIS A hardness, $H_1$ represents a hardness before vulcanization and $H_2$ represents a hardness after vulcanization.

(3) Flex crack growth (flex test)

Flex crack growth was examined by using de Mattia type machine (number of revolution: 300 rpm). Each of three samples was repeatedly subjected to flexings at a measuring temperature of 40° C. until the vulcanized rubber sheets were broken. Evaluation was made by the mean value of the number of flexings at the time of break.

(4) Endurance test (Monsanto fatigue test)

No. 3 type dumbbell specimens described in JIS K 6301 were punched out of vulcanized rubber sheets. Each of 20 specimens was fatigued by elongation under such conditions that the rate of elongation was 200 or 150%, the measuring temperature was 40° C. and the number of revolutions was 300 rpm. The mean value of the number of times at the time of breaking of dumbbell specimens was referred to as an index of endurance.

(5) Heat generation test

Heat generation test was carried out by using Flexometer (Goodrich) under such conditions that the load applied was 15 lb and the stroke was 6.9 mm according to ASTM D 623. Raised temperature (a change in temperature, $T_2-T_1=\Delta T$) was measured. The number of specimens subjected to the test was two. The temperature at which the experiment was initiated was 37° C.

EXAMPLE 1

While applying heat, 100 parts by weight of an ethylene-propylene-diene rubber (hereinafter abbreviated to EPDM-1) having a Mooney viscosity $ML_{1+4}$ (100° C.) of 82 and, $W_r$ of 80, composed of 70% by weight of a high-molecular-weight ethylene-propylene-5-ethylidene-2-norbornene copolymer rubber having an ethylene content of 70 mol %, an intrinsic viscosity [η] of 3.6 dl/g as measured at 135° C. in decalin and an iodine value of 20, and 30% by weight of a low-molecular-weight ethylene-propylene-5-ethylidene-2-norbornene copolymer rubber having an ethylene content of 70 mol %, an intrinsic viscosity [η] of 0.24 dl/g as measured at 135° C. in decalin and an iodine value of 20 and 0.75 parts by weight of sulfur were kneaded under shear at 130° C. for 3 minutes by using a kneader to disperse sulfur in the rubber.

In a 4.3 liter Banbury mixer (manufactured by Kobe Steel, Ltd.) there were kneaded the resulting ethylene-propylene rubber containing sulfur dispersed therein, 1 part by weight of stearic acid, 5 part by weight of zinc oxide No. 1, 60 parts by weight of FEF-HS carbon (Niteron #10, manufactured by Shin Nittetsu Kagaku KK) and 10 parts by weight of oil (P-300, manufactured by Fuji Kosan KK).

To the resulting kneaded product were added 1.5 parts by weight of vulcanization accelerator (trade name: NOCCELER M, a product of Ouchi Shinko Kagaku Kogyo KK), .1.5 parts by weight of vulcanization accelerator (trade name: NOCCELER DM, a product of Ouchi Shinko Kagaku Kogyo KK) and 0.5 parts by weight of vulcanization accelerator (trade name: NOCCELER TT, a product of Ouchi Shinko Kagaku Kogyo KK). The mixture was kneaded by means of 14 inch rollers under such conditions that the mixing time with rollers was 4 minutes, the surface temperatures of open roll were 50° C. on front roll and 60° C. on back roll and the number of revolutions of front roll was 16 rpm and the number of revolutions of back roll was 18 rpm. The kneaded product was processed into a sheet and pressed at 150° C. for 30 minutes to obtain a vulcanized sheet of 2 mm in thickness. The vulcanized sheet was subjected to tensile test, thermal aging resistance test, flex test, endurance test and heat generation test.

The results are shown in Table 1.

COMPARATIVE EXAMPLE 1

In a 4.3 liter Banbury mixer (manufactured by Kobe Steel, Ltd.) were kneaded 70 parts by weight of natural rubber (NR) [RSS No.1], 30 parts by weight of styrene-butadiene rubber (SBR) (trade name: Tafuden 1530, a product of Asahi Chemical Industry Co., Ltd.), 1 part by weight of stearic acid, 5 parts by weight of zinc oxide No. 1, 50 parts by weight of FEF-HS carbon (Niteron #10, manufactured by Shin Nittetsu Kagaku KK) and 40 parts by weight of oil (P-300, manufactured by Fuji Kosan KK).

To the kneaded product were added 1 part by weight of sulfur and 3 parts by weight of vulcanization accelerator (NOCCELER CZ, a product of Ouchi Shinko Kagaku Kogyo KK). The mixture was kneaded by using rollers, processed into a sheet and pressed at 150° C. for 30 minutes to obtain a vulcanized sheet of 2 mm in thickness. The vulcanized sheet was evaluated. The results are shown in Table 1.

COMPARATIVE EXAMPLE 2

In a 4.3 liter Banbury mixer (manufactured by Kobe Steel, Ltd.) were kneaded 100 parts by weight of EPDM-1 of Example 1, 1 part by weight of stearic acid, 5 parts by weight of zinc oxide No. 1, 50 parts by weight of FEF-HS carbon (Niteron 910, manufactured by Shin Nittetsu Kagaku Kogyo KK) and 10 parts by weight of oil (P-300, manufactured by Fuji Kosan KK).

To the resulting kneaded product were added 0.75 part by weight of sulfur, 1.5 parts by weight of vulcanization accelerator (NOCCELER M, a product of Ōuchi Shinko Kagaku Kogyo KK), 1.5 parts by weight of vulcanization accelerator (NOCCELER DM, a product of Ōuchi Shinko Kagaku Kogyo KK) and 0.5 parts by weight of vulcanization accelerator (NOCCELER TT, a product of Ōuchi Shinko Kagaku Kogyo KK). The mixture was kneaded by using 14 inch rollers under such conditions that the mixing time with rollers was 4 minutes, the surface temperatures of open roll were 50° C. on front roll and 60° C. on back roll and the number of revolutions of front roll was 16 rpm and the number of revolutions of back roll was 18 rpm. The kneaded product was processed into a sheet and pressed at 150° C. for 30 minutes to obtain a vulcanized sheet of 2 mm in thickness. The evaluation of the vulcanized sheet was made.

The results are shown in Table 1.

COMPARATIVE EXAMPLE 3

The procedure of Comparative Example 2 was repeated except that the high-molecular-weight ethylene-propylene-5-ethylidene-2-norbornene copolymer rubber ($\omega_r$: not less than 200) which was a component for forming EPDM-1 was used in the place of the EPDM-1 of Example 1 and the amount of oil was 60 parts by weight to obtain a vulcanized sheet of 2 mm in thickness. The evaluation of the vulcanized sheet was made.

The result is shown in Table 1.

TABLE 1

| | Ex. 1 | Comp. Ex. 1 | Comp. Ex. 2 | Comp. Ex. 3 |
|---|---|---|---|---|
| Modulus 100% [kg/cm2] JIS K 6301 Measuring temp. 25° C. | 13 | 17 | 13 | 14 |
| $T_B$ [kg/cm²] | 240 | 210 | 190 | 185 |
| $E_B$ [%] | 710 | 560 | 600 | 580 |
| Thermal aging resistance | | | | |
| $A_R$ ($T_B$) [%] | 78 | 35 | 76 | 74 |
| $A_R$ ($E_B$) [%] | 89 | 34 | 82 | 85 |
| $A_H$ (JIS A) | +2 | +9 | +2 | +2 |
| Crack growth | | | | |
| The number of flexings [times] Endurance test (Monsanto fatigue test) | 62,000 | 60,000 | 10,000 | 6,000 |
| (mean life) rate | 1,500,000 | 18,500 | 6,900 | 4,300 |

TABLE 1-continued

| | Ex. 1 | Comp. Ex. 1 | Comp. Ex. 2 | Comp. Ex. 3 |
|---|---|---|---|---|
| of elongation 200% [times] | (not broken) | | | |
| Heat generation test | | | | |
| Raised temp. [°C.] | 39.5 | 30.0 | 72.0 | 68.5 |

Note:
$A_R$ ($T_B$): Retention of stress at break
$A_R$ ($E_B$): Retention of elongation at break
$A_H$ (JIS A): Change of JIS A hardness determined according to JIS K 6301

COMPARATIVE EXAMPLE 4

An ethylene-propylene-diene rubber (Mitsui EPT 3091, a product of Mitsui Petrochemical Industries, Ltd.) was masticated for 2 minutes by using 8 inch rollers under such conditions that the surface temperatures of open roll were 50° C. on front roll and 50° C. on back roll and the number of revolutions of front roll was 16 rpm and the number of revolutions of back roll was 18 rpm.

To 100 parts by weight of the masticated ethylene-propylene-diene rubber were added 1 part by weight of stearic acid and 5 parts by weight of zinc flower No. 1, and the mixture was kneaded. To the resulting kneaded product were added 60 parts by weight of FEF-HS carbon (Niteron #10, manufactured by Shin Nittetsu Kagaku KK) and 60 parts by weight of oil (P-300, manufactured by Fuji Kosan KK), and the mixture was kneaded.

To the resulting kneaded product were added 0.75 part by weight of sulfur (a product of Hosoi Kagaku Kogyo KK), 1.5 parts by weight of vulcanization accelerator (NOCCELER PZ, a product of Ōuchi Shinko Kagaku Kogyo KK), 1.5 parts by weight of vulcanization accelerator (NOCCELER TT, a product of Ōuchi Shinko Kagaku Kogyo KK) and 0.5 parts by weight of vulcanization accelerator (NOCCELER M, a product of Ōuchi Shinko Kagaku Kogyo KK). The mixture was processed into a sheet and pressed at 160° C. for 18 minutes to obtain a vulcanized sheet of 2 mm in thickness. The vulcanized sheet was subjected to tensile test, thermal aging test, endurance test and heat generation test.

The results are shown in Table 2.

EXAMPLE 2

A solution of the ethylene-propylene-diene rubber of Comparative Example 4 dissolved in a solution of hexane/benzene=50/50 by volume was prepared. Further, a solution of sulfur in benzene was previously prepared wherein sulfur was used in such an amount to provide 0.75 parts by weight of sulfur per 100 parts by weight of the rubber component. Said solution of the ethylene-propylene-diene rubber was mixed with said solution of sulfur. The solvents were removed from the mixed solution to obtain the ethylene-propylene-diene rubber containing sulfur dispersed therein.

The procedure of Comparative Example 4 was then repeated except that the ethylene-propylene-diene rubber obtained above was used, the surface temperature of each of the front roll and the back roll was 120° C. and sulfur was not used in the final kneading stage to obtain a vulcanized sheet of 2 mm in thickness. The evaluation of the vulcanized sheet was made.

The results are shown in Table 2.

EXAMPLE 3

The procedure of Example 2 was repeated except that there was used the ethylene-propylene-diene rubber containing sulfur dispersed therein obtained by kneading the ethylene-propylene-diene rubber of Comparative Example 4 and 0.75 part by weight, based on 100 parts by weight of the rubber component, of sulfur at a temperature of 120° C. for 2 minutes by using a kneader to obtain a vulcanized sheet of 2 mm in thickness. The evaluation of the vulcanized sheet was made.

The results are shown in Table 2.

TABLE 2

|  | Comp. Ex. 4 | Example 2 | Example 3 |
|---|---|---|---|
| Modulus 100% [kg/cm$^2$] JIS K 6301 Measuring temp. 25° C. | 13 | 12 | 12 |
| $T_B$ [kg/cm$^2$] | 151 | 184 | 185 |
| $E_B$ [%] | 800 | 850 | 850 |
| Thermal aging resistance |  |  |  |
| $A_R$ ($T_B$) [%] | 73 | 74 | 74 |
| $A_R$ ($E_B$) [%] | 82 | 85 | 89 |
| $A_H$ (JIS A) | +2 | +2 | +2 |
| Endurance test (Monsanto fatigue test) |  |  |  |
| [times] (n = 20; mean life) rate of elongation 150% | 400,000 | 1,000,000 (not broken) | 1,000,000 (not broken) |
| Heat generation test |  |  |  |
| Raised temp. [°C.] | blow out | 63 | 63 |

Note:
$A_R$ ($T_B$): Retention of stress at break
$A_R$ ($E_B$): Retention of elongation at break
$A_H$ (JIS A): Change of JIS A hardness determined according to JIS K 6301

It is apparent from the Monsanto fatigue test results of Table 2 that the vulcanized rubbers obtained by using EPDM containing sulfur previously dispersed therein have excellent dynamic fatigue resistance in comparison with vulcanized rubber obtained by using EPDM to which sulfur was added in the final kneading stage. It is expected that the vulcanized rubbers of Examples 2 and 3 are excellent in fatigue resistance under a load as in tires and rubber vibration insulators, since they do not cause blow out.

COMPARATIVE EXAMPLE 5

While applying heat, 100 parts by weight of an ethylene-propylene-diene rubber comprising 70% by weight of a high-molecular-weight ethylene-propylene-5-ethylidene-2-norbornene copolymer rubber having an ethylene content of 70 mol %, an intrinsic viscosity [η] of 2.5 dl/g as measured at 135° C. in decalin and an iodine value of 20, and 30% by weight of a low-molecular-weight ethylene-propylene-5-ethylidene-2-norbornene copolymer rubber having an ethylene content of 70 mol %, an intrinsic viscosity [η] of 0.3 dl/g as measured at 135° C. in decalin and an iodine value of 20, and 2.0 parts by weight of sulfur were kneaded under shear at 130° C. for 3 minutes by using a kneader to disperse sulfur.

In a 4.3 liter Banbury mixer (manufactured by Kobe Steel, Ltd.) were kneaded the resulting ethylene-propylene rubber containing sulfur dispersed therein, 1 part by weight of stearic acid, 5 parts by weight of zinc flower No. 1, 60 parts by weight of FEF-HS carbon (60 HG, manufactured by Asahi Carbon KK) and 60 parts by weight of oil (P-300, manufactured by Fuji Kosan KK).

To the thus-obtained kneaded product were added 0.5 parts by weight of vulcanization accelerator (trade name: NOCCELER M, a product of Ōuchi Shinko Kagaku Kogyo KK) and 1.5 parts by weight of vulcanization accelerator (trade name: NOCCELER TT, a product of Ōuchi Shinko Kagaku Kogyo KK). The mixture was kneaded by using 14 inch rollers under such conditions that the mixing time with rollers was 4 minutes, the surface temperatures of open roll were 50° C. on front roll and 60° C. on back roll and the number of revolutions of front roll was 16 rpm and the number of revolutions of back roll was 18 rpm. The kneaded material was processed into a sheet and pressed at 150° C. for 20 minutes to obtain a vulcanized sheet of 2 mm in thickness. The vulcanized sheet was subjected to tensile test, hardness test (JIS A hardness), endurance test and heat generation test.

Each of the above blends was introduced into a pressurized type kneader (TDI-5 type, manufactured by Toshin Sangyo KK), and mixing was conducted under heating with steam. The resulting mixture was wound around the front roll (roll manufactured by Terakawa Seisakusho; 8"ø×20"L steam heating water-cooled automatic temperature controlling type), and 4 cuts was given it from right and left sides. After one minute, the roll processability of the mixture was evaluated. The space between the front roll and the back roll was 0.6 mm.

Indication Level of Roll Processability

E: Excellent
G: Good
F: Fair
P: Poor
VP: Very poor

Criterion of Indication (1) After the first cut, the kneaded material wound around the roll was evaluated.

Lower limit of E: No hole was found from the beginning.

Lower limit of G: About 10 or less of small holes of 2 to 5 mmø and several holes of about 10 mmø were found.

Lower limit of F: Parts joined together on the surface of the roll amounted to at least 50% of the kneaded material.

Lower limit of P: Most of the kneaded material was sagging and only a part thereof was wound around the roll.

Upper limit of VP: The kneaded material came off from the roll unless it was supported by the hand.

(2) After each of the second, third and fourth cuts, the kneaded material wound around the roll was evaluated.

Lower limit of E: There was not found a tendency to cause bagging, and the kneaded material was completely in close contact with the roll.

Lower limit of F: The kneaded material was apparently in close contact with the roll and did not come off, but wariness was partly formed on the upper part of the roll. Even if bagging was caused by slip, etc., the kneaded material could be restored to the original state by one correction with human power, though it could be restored by itself.

Lower limit of G: The kneaded material was in close contact with the outer periphery of the lower half of the front roll, but when the kneaded material was passed therethrough, it was in poor contact with the upper part of the roll and waviness was partly formed.

Lower limit of P: Bagging was caused, but the kneaded material could be prevented from sagging from the roll when correction was made at intervals.

Upper limit of VP: Bagging was caused and the kneaded material was sagging from the roll unless correction was continuously made.

The above results are shown in Table 3.

EXAMPLES 4 AND 5

The procedure of Comparative Example 5 was repeated except that a high-molecular-weight ethylene-propylene-5-ethylidene-2-norbornene copolymer rubber having an ethylene content of 70 mol %, an intrinsic viscosity [η] of 3.0 dl/g as measured at 135° C. in decalin and an iodine value of 20 and a high-molecular-weight ethylene-propylene-5-ethylidene-2-norbornene copolymer rubber having an ethylene content of 70 mol %, an intrinsic viscosity [η] of 4.6 dl/g as measured at 135° C. in decalin and an iodine value of 20 were used in Example 4 and Example 5, respectively, in place of the high-molecular-weight ethylene-propylene-5-ethylidene-2-norbornene copolymer rubber of Comparative Example 5 to obtain vulcanized sheets of 2 mm in thickness. The evaluation of the valucanized sheets was made. Roll processability was also evaluated in the same way as in Comparative Example 5.

The results are shown in Table 3.

COMPARATIVE EXAMPLE 6

The procedure of Comparative Example 5 was repeated except that a high-molecular-weight ethylene-propylene-5-ethylidene-2-norbornene copolymer rubber having an ethylene content of 70 mol %, an intrinsic viscosity [η] of 5.2 dl/g as measured at 135° C. in decalin and an iodine value of 20 was used in place of the high-molecular-weight ethylene-propylene-5-ethylidene-2-norbornene copolymer rubber of Comparative Example 5 to obtain a vulcanized sheet of 2 mm in thickness. The evaluation of the valucanized rubber was made. Roll processability was also evaluated in the same way as in Comparative Example 5.

The results are shown in Table 3.

COMPARATIVE EXAMPLES 7 AND 8

The procedure of Comparative Example 5 was repeated except that a high-molecular-weight ethylene-propylene-5-ethylidene-2-norbornene copolymer rubber having an ethylene content of 70 mol %, an intrinsic viscosity [η] of 4.6 dl/g as measured at 135° C. in decalin and an iodine value of 20 was used in place of the high-molecular-weight ethylene-propylene-5-ethylidene-2-norbornene copolymer rubber of Comparative Example 5, and a low-molecular-weight ethylene-propylene-5-ethylidene-2-norbornene copolymer rubber having an ethylene content of 70 mol %, an intrinsic viscosity [η] of 0.10 dl/g as measured at 135° C. in decalin and an iodine value of 20 and a low-molecular-weight ethylene-propylene-5-ethylidene-2-norbornene copolymer rubber having an ethylene content of 70 mol %, an intrinsic viscosity [η] of 1.0 dl/g as measured at 135° C. in decalin and an iodine value of 20 were used in Comparative Example 7 and Comparative Example 8, respectively, in place of the low-molecular-weight ethylene-propylene-5-ethylidene-2-norbornene copolymer rubber of Comparative Example 5 to obtain vulcanized sheets of 2 mm in thickness. The evaluation of the valucanized sheets was made. Roll processability was also evaluated in the same way as in Comparative Example 5.

The results are shown in Table 3.

TABLE 3

|  | Comp. Ex. 5 | Ex. 4 | Ex. 5 | Comp. Ex. 6 | Comp. Ex. 7 | Comp. Ex. 8 |
| --- | --- | --- | --- | --- | --- | --- |
| Measuring temp. 25° C. | | | | | | |
| $T_B$ [kg/cm$^2$] | 185 | 195 | 200 | 195 | 210 | 215 |
| $E_B$ [%] | 500 | 560 | 580 | 590 | 570 | 650 |
| Hs (JIS A hardness) (Note 1) | 55 | 54 | 54 | 55 | 54 | 62 |
| Endurance test (Monsanto fatigue test) (mean life) rate of elongation 200% [times] | 100,000 | 400,000 | 480,000 | 250,000 | 280,000 | 200,000 |
| Heat generation test | | | | | | |
| Raised temp. [°C.] | 65 | 58 | 55 | 63 | 68 | 69 |
| Processability | E | E | E | P | P | P |

(Note 1) Hs: JIS A hardness determined according to JIS K 6301

What is claimed is:

1. An unvulcanized vulcanizable rubber mixture which consists essentially of
    (A) 90% to 40% by weight of a high-molecular-weight ethylene-propylene-diene rubber having an ethylene content of 60 to 82 mol %, an intrinsic viscosity (η) of 3.0 to 5.0 dl/g as measured at 135° C. in decalin and an iodine value of 8 to 35,
    (B) 10 to 60% by weight of a low-molecular-weight ethylene-propylene-diene rubber having an ethylene content of 60 to 82 mol %, an intrinsic viscosity (η) of 0.15 to 0.8 dl/g as measured at 135° C. in decalin and an iodine value of 8 to 35, and (C) sulfur, in an amount of 0.3 to 3 parts by weight based on 100 parts be weight of said ethylene-propylene-diene rubber, wherein the sulfur is uniformly dispersed therein at a temperature of 90° to 160° C., prior to the addition of a vulcanization accelerator, wherein the diene component of said rubber is a non-conjugated diene and said rubber mixture has a Mooney viscosity $ML_{1+4}$ (100° C.) of 60 to 120 and $\omega_r$=50 to 150.

2. A vulcanized rubber obtained by vulcanizing a vulcanizable elastomer composition comprising an unvulcanized vulcanizable rubber mixture which mixture consists essentially of
  (A) 90 to 40% by weight of a high-molecular-weight ethylene-propylene-diene rubber having an ethylene content of 60 to 82 mol %, an intrinsic viscosity ( ) of 3.0 to 5.0 dl/g as measured at 135° C. in decalin and an iodine value of 8 to 35,
  (B) 10 to 60% by weight of a low-molecular-weight ethylene-propylene-diene rubber having an ethylene content of 60 to 82 mol %, an intrinsic viscosity ( ) of 0.15 to 0.8 dl/g as measured at 135° C. in decalin and an iodine value of 8 to 35, and
  (C) sulfur, in an amount of 0.1 to 3 parts by weight based on 100 parts by weight of said ethylene-propylene-diene rubber, wherein the sulfur is uniformly dispersed therein at a temperature of 90° to 160° C., prior to the addition of a vulcanization accelerator, and
  (D) a vulcanization accelerator, wherein the ethylene-propylene-diene rubber has a Mooney viscosity of $ML_{1+4}$ (100° C.) of 60 to 120.

3. The vulcanized rubber of claim 2 wherein in the ethylene-propylene-diene rubber mixture $\omega_r$=50 to 150.

4. A process for preparing a vulcanized rubber which comprises the successive steps of:
  (a) uniformly dispersing sulfur at a temperature of 90°–160° C. in an ethylene-propylene-diene rubber, in an amount of 0.1 to 5.0 parts by weight of sulfur based on 100 parts by weight of the rubber, which is a mixture of
    (A) 90–40% by weight of a high-molecular-weight ethylene-propylene-diene rubber having an ethylene content of 60 to 80 mol %, an intrinsic viscosity ($\eta$) of 3.0 to 5.0 dl/g as measured at 135° C. in decalin and an iodine value of 8 to 35, and
    (B) 10 to 60% by weight of a low-molecular-weight ethylene-propylene-diene rubber having an ethylene content of 60 to 82 mol %, an intrinsic viscosity ($\eta$) of 0.15 to 0.8 dl/g as measured at 135° C. in decalin and an iodine value of 8 to 35, wherein the sulfur is dispersed prior to the addition of an accelerator, to obtain an unvulcanized vulcanizable rubber having a Mooney viscosity $ML_{1+4}$ (100° C.) of 60 to 120,
  (b) adding an accelerator to the sulfur dispersed mixture to produce a vulcanizable elastomer composition, and
  (c) vulcanizing the vulcanizable elastomer composition to obtain vulcanized rubber.

5. The process for preparing a vulcanized rubber of claim 4, wherein the ethylene-propylene-diene rubber mixture $\omega_r$=50 to 150.

6. The process for preparing a vulcanized rubber of claim 4 wherein the sulfur is dispersed in the ethylene-propylene-diene rubber at a temperature of 110° to 150° C.

7. A vulcanized rubber as claimed in claim 2 wherein the vulcanized rubber has a Monsanto Fatigue Endurance Test value of at least 400,000.

8. A vulcanized rubber as claimed in claim 2 wherein the vulcanized rubber has a Monsanto Fatigue Endurance Test value of at least 1,000,000.

9. An unvulcanized vulcanizable rubber mixture which consists essentially of
  (A) 90 to 40% by weight of a high-molecular-weight ethylene-propylene-diene rubber having an ethylene content of 60 to 82 mol %, an intrinsic viscosity ($\eta$) of 3.0 to 5.0 dl/g as measured at 135° C. in decalin and an iodine value of 8 to 35,
  (B) 10 to 60% by weight of a low-molecular-weight ethylene-propylene-diene rubber having an ethylene content of 60 to 82 mol %, an intrinsic viscosity ($\eta$) of 0.15 to 0.8 dl/g as measured at 135° C. in decalin and an iodine value of 8 to 35, and
  (C) sulfur, in an amount of 0.1 to 3 parts by weight based on 100 parts by weight of said ethylene-propylene-diene rubber, wherein the sulfur is uniformly dispersed therein by mixing a solution of sulfur with a solution of ethylene-propylene-diene rubber, followed by removing the solvent, prior to the addition of a vulcanization accelerator, wherein said rubber mixture has a Mooney viscosity $ML_{1+4}$ (100°) of 60 to 120.

10. The vulcanizable rubber mixture of claim 9, wherein $\omega_r$=50 to 150.

11. A vulcanized rubber obtained by vulcanizing a vulcanizable elastomer composition comprising an ethylene-propylene-diene rubber mixture which consists essentially of
  (A) 90 to 40% by weight of a high-molecular weight ethylene-propylene-diene rubber having an ethylene content of 60 to 82 mol %, an intrinsic viscosity ( ) of 3.0 to 5.0 dl/g as measured at 135° C. in decalin and an iodine value of 8 to 35,
  (B) 10 to 60% by weight of a low-molecular-weight ethylene-propylene-diene rubber having an ethylene content of 60 to 82 mol %, an intrinsic viscosity ( ) of 0.15 to 0.8 dl/g as measured at 135° C. in decalin and an iodine value of 8 to 35, and
  (C) sulfur, in an amount of 0.1 to 3 parts by weight based on 100 parts by weight of said ethylene-propylene-diene rubber, wherein the sulfur is uniformly dispersed therein by mixing a solution of sulfur with a solution of ethylene-propylene-diene rubber, followed by removing the solvent, prior to the addition of a vulcanization accelerator, and
  (D) a vulcanization accelerator, wherein the ethylene-propylene-diene rubber has a Mooney viscosity $ML_{1+4}$ (100° C.) of 60 to 120.

12. The vulcanized rubber of claim 11, wherein in the ethylene-propylene-diene rubber mixture $\omega_r$=50 to 150.

13. A process for preparing a vulcanized rubber which comprises the successive steps of:
  (a) uniformly dispersing sulfur in an ethylene-propylene-diene rubber by mixing a solution of the sulfur with a solution of the ethylene-propylene-diene rubber at a temperature of 90° to 160° C., in an amount of 0.1 to 3.0 parts by weight of sulfur based on 100 parts by weight of the rubber, prior to the addition of a vulcanization accelerator to obtain a vulcanizable elastomer composition,
  (b) removing the solvent,
  (c) adding a vulcanization accelerator, and
  (d) vulcanizing the vulcanizable elastomer composition to obtain the vulcanized rubber, wherein said ethylene-propylene-diene rubber is a mixture of
    (A) 90 to 40% by weight of a high-molecular-weight ethylene-propylene-diene rubber having an ethylene content of 60 to 82 mol %, an intrinsic viscosity ($\eta$) of 3.0 to 5.0 dl/g as measured at 135° C. in decalin and an iodine value of 8 to 35, (B) 10 to 60% by weight of a low-molecular-weight ethylene-propylene-diene rubber having an ethylene content of 60 to 82 mol %, an intrinsic viscosity ($\eta$) of 0.15 to 0.8 dl/g as measured at 135° C. in decalin and an iodine value of 8 to 35, wherein the ethylene-propylene-diene rubber has a Mooney viscosity $ML_{1+4}$ (100° C.) of 60 to 120.

14. The process for preparing a vulcanized rubber of claim 13, wherein in the ethylene-propylene-diene mixture $\omega_r$=50 to 150.

15. The vulcanized rubber of claim 2, wherein the diene component of the ethylene-propylene-diene rubber is a cyclic non-conjugated diene which is a member selected from the group consisting of ethylidenenorbornene, norbornadiene, methylnorbornene, dicyclopentadiene, 2-methylnorbornadiene and 5-vinyl-2-norbornene.

16. The process of claim 4, wherein the diene component of the ethylene-propylene-diene rubber is a cyclic non-conjugated diene which is a member selected from the group consisting of ethylidenenorbornene, norbornadiene, methylnorbornene, dicyclopentadiene, 2-methylnorbornadiene and 5-vinyl-2-norbornene.

* * * * *